(12) United States Patent
Jeong (10) Patent No.: US 9,369,622 B2
(45) Date of Patent: Jun. 14, 2016

(54) PORTABLE DEVICE WITH CAMERA

(71) Applicant: SAMSUNG DISPLAY CO., LTD., Yongin, Gyeonggi-Do (KR)

(72) Inventor: Seung-Heui Jeong, Yongin (KR)

(73) Assignee: SAMSUNG DISPLAY CO., LTD., Yongin (KR)

( * ) Notice: Subject to any disclaimer, the term of this patent is extended or adjusted under 35 U.S.C. 154(b) by 90 days.

(21) Appl. No.: 14/032,926

(22) Filed: Sep. 20, 2013

(65) Prior Publication Data
US 2014/0307144 A1   Oct. 16, 2014

(30) Foreign Application Priority Data

Apr. 15, 2013   (KR) .................. 10-2013-0041259

(51) Int. Cl.
*H04N 5/232* (2006.01)
*H04N 5/225* (2006.01)

(52) U.S. Cl.
CPC ............. *H04N 5/232* (2013.01); *H04N 5/2254* (2013.01); *H04N 5/23216* (2013.01); *H04N 5/23293* (2013.01)

(58) Field of Classification Search
CPC ............ H04N 5/23293; H04N 5/2228; H04N 1/00411; H04N 1/00408; H04N 5/232
USPC ................................. 348/333.01–333.12, 373
See application file for complete search history.

(56) References Cited

U.S. PATENT DOCUMENTS

| 8,193,017 | B2 | 6/2012 | Kim et al. | |
| 8,274,090 | B2 | 9/2012 | Choi et al. | |
| 8,357,938 | B2 | 1/2013 | Yoon et al. | |
| 2008/0247749 | A1* | 10/2008 | Law et al. | 396/535 |
| 2010/0060548 | A1 | 3/2010 | Choi et al. | |
| 2011/0164047 | A1 | 7/2011 | Pance | |
| 2012/0244910 | A1* | 9/2012 | Hsu | 455/566 |

FOREIGN PATENT DOCUMENTS

| KR | 10-0650190 B1 | 11/2006 |
| KR | 10-2010-0030114 A | 3/2010 |
| KR | 10-2010-0113869 A | 10/2010 |
| KR | 10-1107178 B1 | 1/2012 |

* cited by examiner

*Primary Examiner* — Nelson D. Hernández Hernández
(74) *Attorney, Agent, or Firm* — Knobbe Martens Olson & Bear LLP (57) ABSTRACT

Provided is a display device including: a body; a first display provided on the body; and a camera provided in the body. The first display is substantially transparent and selectively bendable to be in front of the camera. The first display includes an optical adjusting unit providing an optical function to the camera.

20 Claims, 7 Drawing Sheets

PORTABLE DEVICE WITH CAMERA

CROSS-REFERENCE TO RELATED PATENT APPLICATION

This application claims the benefit of Korean Patent Application No. 10-2013-0041259, filed on Apr. 15, 2013, in the Korean Intellectual Property Office, the disclosure of which is incorporated herein in its entirety by reference.

BACKGROUND

1. Field

The present disclosure relates to a portable device with a camera.

2. Discussion of the Related Technology

Portable devices, such as mobile phones or tablet personal computers (PCs), include a display and a camera unit.

In order to provide various optical effects to the camera unit, image data stored after capturing may be additionally processed by using software or the camera unit having high specifications may be manipulated before and/or simultaneously with the capturing.

However, when the image data stored after the capturing is processed, an image having a high quality may not be obtained, and there is a space limitation to make it difficult to include the camera unit having high performance in a mobile device. In other words, in order for the camera unit to incorporate an optical effect such as zooming, magnifying, filtering, the size of the camera increases due to incorporated equipment such as a mounted type lens and/or exchange type lens or filter. The increased size of the camera would increase the size of the mobile device in which the camera is mounted and deteriorate portability of the mobile device.

SUMMARY

One aspect of the present invention provides a display device capable of providing a physical optical effect to a camera.

One aspect of the present invention provides a portable device including: a body; a first display provided on the body; and a camera provided in the body, wherein the first display is substantially transparent, is selectively bendable to be in front of the camera, and includes an optical adjusting unit providing an optical function to the camera.

The first display may further include a touch sensing portion.

The touch sensing portion may be disposed on a surface facing away from the body.

The optical adjusting unit may include a selective lens unit including an electrode and an electroactive polymer layer that is electrically connected to the electrode and is substantially transparent.

The optical adjusting unit may include a color changing unit configured to change a color of the external light passing through the first display.

The body may include a second display disposed between the first display and the body and configured to display an image towards the first display, wherein the image of the second display may pass through the first display.

Another aspect of the present invention provides a portable device including: a body including a camera; and a first display combined to the body, and being substantially transparent, wherein the first display includes an extending portion that extends from the body, and the extending portion is selectively bendable to overlap the camera.

The first display may be flexible.

The first display may further include a lens unit in the extending portion, wherein the lens unit may include an electrode and an electroactive polymer layer that is electrically connected to the electrode and is substantially transparent.

The first display may further include a color changing unit configured to change a color of the external light passing through the extending portion.

The body may further include a second display disposed between the first display and the body and configured to display an image towards the first display.

Still another aspect of the invention provides a portable device, which may include: a body comprising a first surface and a second surface facing away from the first surface; a camera provided on the first surface; and a deformable film extending from the body and configured to deform for a portion thereof to be placed in front of the camera such that the camera is to capture an image through the portion.

In the foregoing device, the film may be in touch with and fixed to a surface of the body other than first surface. The portable device may further comprise a magnifying lens placed on the portion such that the image through the portion is magnified before reaching the camera. The magnifying lens may include a deformable sheet placed over the portion of the flexible film, wherein the deformable sheet may be configured to deform for changing a magnifying ratio of the lens such that the image is magnified with a varying magnifying ratio before reaching the camera. The deformable sheet may comprise an electroactive polymer layer and an electrode configured to apply electricity to the electroactive polymer layer.

Still in the foregoing device, the portion may comprise a light emitting matrix therein capable of generating colored light such that the image through the portion is colored before reaching the camera. The device may further comprise a display on the second surface of the body, wherein the deformable film is an extension of the display. The device may further comprise a display configured to display the image captured by the camera on a surface thereof, wherein the flexible film is an extension of the display and the display is further configured to display another image on a surface of the flexible film. Yet in the foregoing device, once deformed, the deformable film is further configured to substantially maintain its structural configuration for image capturing through the portion.

A further aspect of the invention provides a method of operating a portable device. The method may comprise: providing one of the foregoing portable devices; deforming at least part of the deformable film to have the portion placed in front of the camera; and capturing, by the camera, an image through the portion. In the foregoing method, the at least part of the deformable film may be deformed such that at least two layers of the deformable film is placed in front of the camera. Deforming may comprise adjusting a distance between the camera and the portion of the flexible film.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EMBODIMENTS

Hereinafter, embodiments of the present invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements. As used herein, the term "and/or" includes any and all combinations of one or more of the associated listed items.

Figure 1:
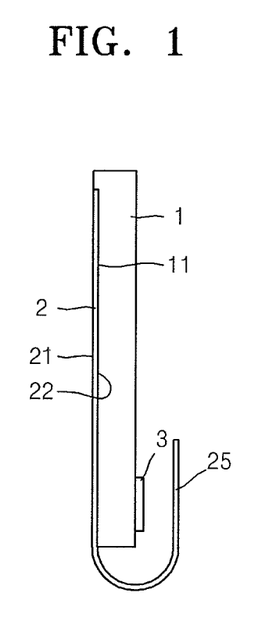
FIG. 1 is a side cross-sectional view schematically illustrating a display device according to an embodiment of the present invention.
Figure 2:
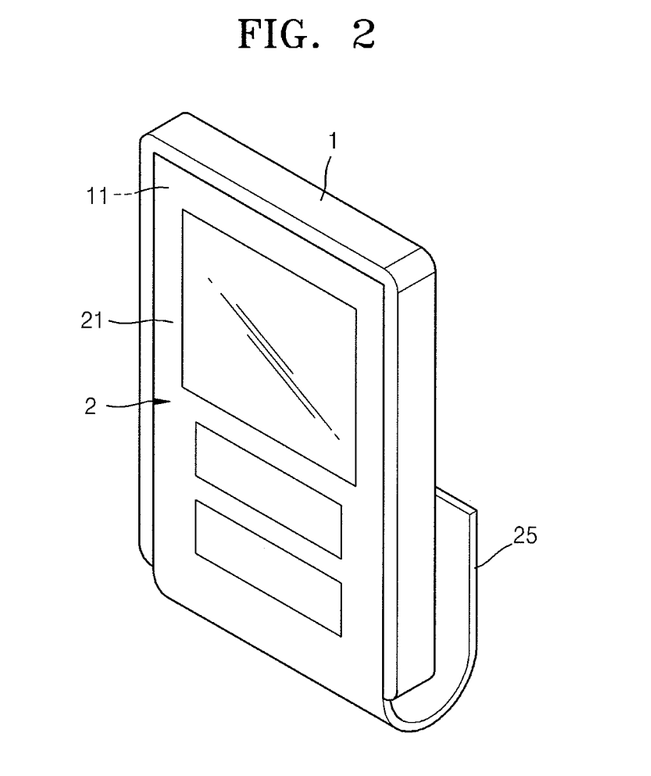
FIG. 2 is a front perspective view of the display device of FIG. 1.
Figure 3:
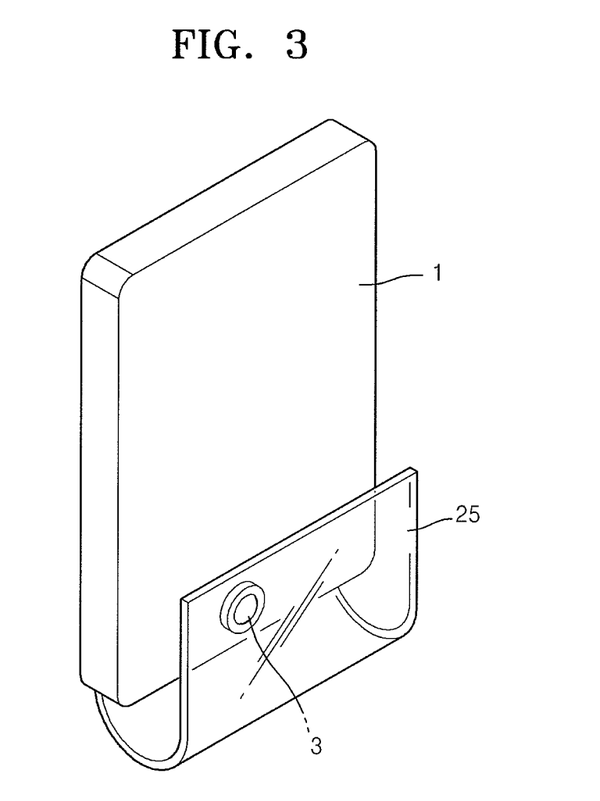
FIG. 3 is a rear perspective view of the display device of FIG. 1.

FIG. 1 is a side cross-sectional view schematically illustrating a display device according to an embodiment of the present invention, FIG. 2 is a front perspective view of the display device of FIG. 1, and FIG. 3 is a rear perspective view of the display device of FIG. 1.

The display device according to the current embodiment includes a body 1, a first display unit 2, and a camera unit 3.

The body 1 may be a case having a box shape, and the first display unit 2 is combined to a front surface 11. Various electronic devices for driving the first display unit 2 by being electrically connected to the first display unit 2 are mounted in the body 1.

The camera unit 3 is provided opposite to the front surface 11 of the body 1. The camera unit 3 is electrically connected to the first display unit 2 to realize or display a captured image to a user through the first display unit 2.

The first display unit 2 is combined to the body 1 while facing the body 1, and is flat. The first display unit 2 is substantially transparent such that external light can pass therethrough the front of the first display unit 2 or the body can be viewed through the first display unit 2.

The first display unit 2 includes a first surface 21 facing one direction and a second surface 22 facing the other direction. In embodiments, the first surface 21 faces away from the body 1 and the second surface 22 faces the body. An image is realized through the first surface 21. Accordingly, the user may be in front of the first surface 21 with respect to the first display unit 2.

Meanwhile, in embodiments, the first display unit 2 may be configured such that the external light passes through the first and second surfaces 21 and 22. In embodiments, the display unit 2 is capable of transmitting the external light therethrough. Accordingly, the user located in front of the first surface 21 with respect to the first display unit 2 may observe the front surface 11 of the body 1 as it is viewable through the first display unit 2.

Figure 4:
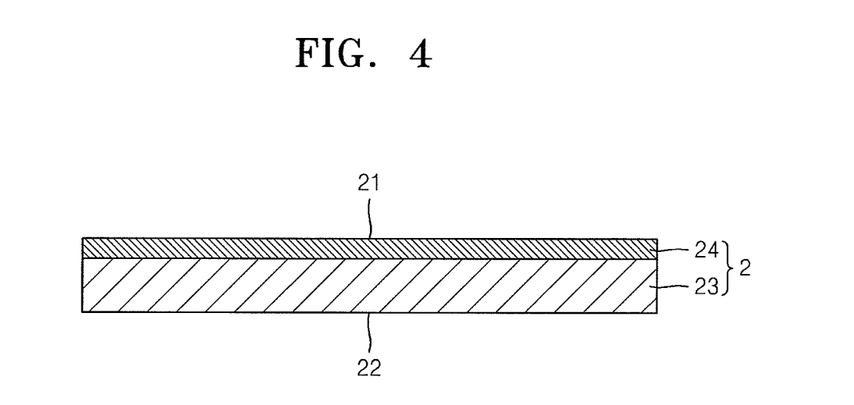
FIG. 4 is a cross-sectional view schematically illustrating another example of a first display unit of the display device of FIG. 1.

As shown in FIG. 4, the first display unit 2 may include a display portion or layer 23 and a touch sensing portion or layer 24.

The display Orton 23 and the touch sensing portion 24 may be combined to each other by an adhesive member (not shown), but alternatively, the touch sensing unit 24 may be integrally formed with the display portion 23 by being deposited on the display portion 23.

The touch sensing portion 24 may be an electrostatic sensing type touch panel or a pressure sensing type touch panel.

Figure 5:
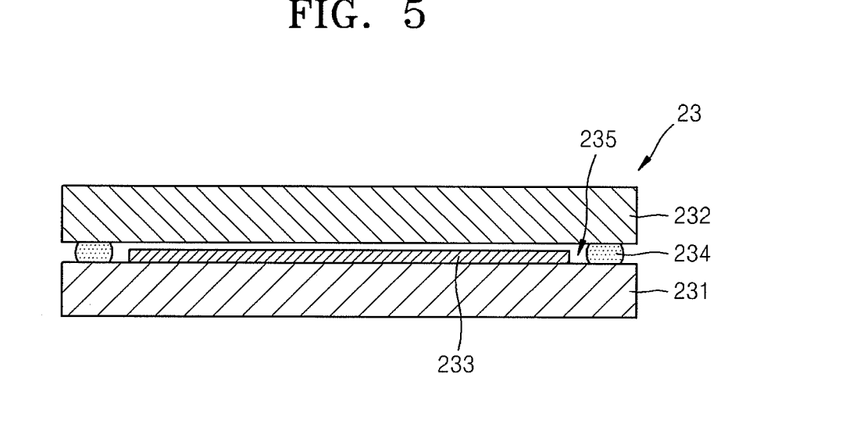
FIGS. 5 and 6 are cross-sectional views of a display portion of the first display unit according to embodiments of the present invention.
Figure 6:
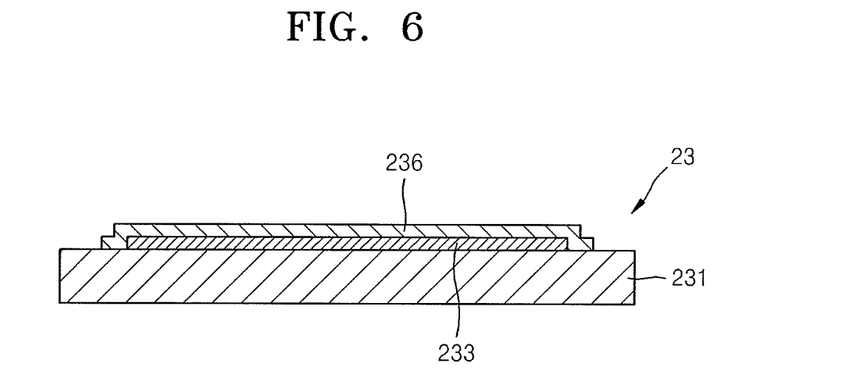

FIGS. 5 and 6 are cross-sectional views of the display portion 23 of the first display unit 2 according to embodiments of the present invention. The display device of FIGS. 5 and 6 is an organic light-emitting display device.

Referring to FIG. 5, the display portion 23 according to an embodiment includes an organic light-emitting portion 233 formed on one surface of a substrate 231, and an encapsulation substrate 232 sealing the organic light-emitting portion 233.

The encapsulation substrate 232 blocks external air and moisture from penetrating into the organic light-emitting portion 233. The substrate 231 and the encapsulation substrate 232 may be formed of a flexible plastic material such that the display portion 23 is bendable. Alternatively, the substrate 231 and the encapsulation substrate 232 may be formed of a bendable thin glass material.

An edge of the substrate 231 and an edge of the encapsulation substrate 23 may be combined to each other by an encapsulation member 234 so that a space 235 between the substrate 231 and the encapsulation substrate 232 is sealed. A moisture absorbent material or a filler may be disposed in the space 235.

As shown in FIG. 6, an encapsulation film 236 in a thin film may be formed on the organic light-emitting portion 233 instead of the encapsulation substrate 232, so as to protect the organic light-emitting portion 233 from external air or moisture. The encapsulation film 236 may have a structure wherein a film formed of an inorganic material, such as silicon oxide or silicon nitride, and a film formed of an organic material, such as epoxy or polyimide, are alternately stacked on each other, but a structure of the encapsulation film 236 is not limited thereto as long as the encapsulation film 236 has an encapsulation structure of a transparent thin film. When the encapsulation film 236 is used for the substrate 231 formed of a plastic material, a bending characteristic and/or flexibility of the display portion 23 may be further improved.

The display device according to the embodiments of FIGS. 5 and 6 may be a bottom emission type wherein an image is realized towards the substrate 231, a top emission type wherein an image is realized towards the encapsulation substrate 232 or the encapsulation film 236, or a both-side emission type wherein an image is realized towards the substrate 231 and the encapsulation substrate 232 or towards the substrate 231 and the encapsulation film 236.

A light emission region and a light transmission region may be separated from each other in one pixel of such an organic light-emitting display device, and thus a transparent and/or see-through display device may be realized.

Accordingly, the organic light-emitting portion or pixel 233 may include a light transmission region through which an external light passes, for example, an organic light-emitting portion disclosed in KR1107178B1, U.S. Pat. Nos. 8,193,017B2, 8,274,090B2, or 8,357,938B2 may be used. Alternatively, any organic light-emitting portion capable of realizing a see-through display device through which an external light passes may be used.

It is not necessary to use the display portion 23 including an organic light-emitting display device, and the display portion 23 may include any one of various flat panel display devices through which an external light is transmitted.

Referring to FIG. 4, the touch sensing portion 24 may be formed on a top surface of the encapsulation substrate 232 of the display portion 23 of FIG. 5, or on a top surface of the encapsulation film 236 of the display portion 23 of FIG. 6. Alternatively, the touch sensing portion 24 may be formed on a bottom surface of the substrate 231 of the display portion 23 of FIG. 5 or 6.

Alternatively, the touch sensing portion 24 may be formed inside the display portion 23. For example, the touch sensing portion 24 may be formed on a bottom surface of the encapsulation substrate 232 of the display portion 23 of FIG. 5, i.e., between the encapsulation substrate 232 and the organic light-emitting portion 233, or may be formed on a top surface of the substrate 231, i.e., between the substrate 231 and the organic light-emitting portion 233. Alternatively, the touch sensing portion 24 may be formed on a bottom surface of the encapsulation film 236 of the display portion 23 of FIG. 6, i.e., between the encapsulation film 236 and the organic light-emitting portion 233, or may be formed on the top surface of the substrate 231, i.e., between the substrate 231 and the organic light-emitting portion 233.

Referring to FIG. 4, the display portion 23 and the touch sensing portion 24 are assembled together to form the first display unit 2, wherein the first surface 21 is one surface of the touch sensing portion 24 and the second surface 22 is one surface of the display portion 23.

However, an embodiment of the present invention is not limited thereto, and alternatively, the first surface 21 may be one surface of the display portion 23 and the second surface 22 may be one surface of the touch sensing portion 24. Alternatively, when the touch sensing portion 24 is formed inside the display portion 23 as described above, the first and second surfaces 21 and 22 may respectively be both sides of the display portion 23.

The embodiments of the first display unit 2 described above may be applied to any embodiments of the present invention described later.

Referring back to FIGS. 1 through 3, the first display unit 2 combined to the front surface 11 of the body 1 may be a flexible flat panel display device through which an external light passes or travels therethrough as described above.

Here, the first display unit 2 may be longer than the body 1, and thus may have an extending portion 25 extending from the body 1. The extending portion 25, as shown in FIG. 1, may have a length capable of covering a part of the body 1 so as to overlap the camera unit 3 or be placed in front of the camera 3 when bending or deforming a portion of the extension 25. Accordingly, the user may selectively bend the extending portion 25 of the first display unit 2 to cover the camera unit 3, and at this time, the user is able to apply optical effects to images being captured by the camera while manipulating or operating the camera unit 3 as shown in FIGS. 1 through 3.

In embodiments, once the extending portion 25 is deformed, the extending portion 25 substantially maintains its structural configuration until the image is captured by the camera through the extending portion 25.

A separate background image or an image of a color filter may be realized and maintained on the extending portion 25 so as to have an optical effect on any external light passing through the extending portion, and thus the user may obtain various optical effects while manipulating or operating the camera unit 3.

One or more manipulation buttons or icons for manipulating the camera unit 3 and/or displaying an image or a color on the extending portion 25 may be displayed on the first surface 21 as an image. An image captured by a camera through the extension 25 may also be displayed on the first surface 21.

Figure 7:
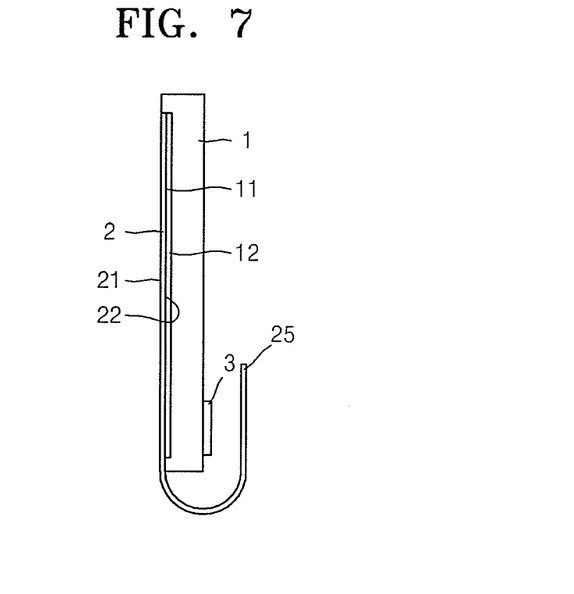
FIG. 7 is a side cross-sectional view schematically illustrating a display device according to another embodiment of the present invention.

However, an embodiment of the present invention is not limited thereto. As shown in FIG. 7, the body 1 may further include a second display unit 12 overlapping the first display unit 2 and realizing an image towards the first display unit 2. The first display unit 2 may allow the external light to pass therethrough. In embodiments, the second display unit 12 may display various manipulation buttons or icons for manipulating the camera unit 3 and/or images being displayed on the extending portion 25. Accordingly, the user may view and/or touch an image realized by the second display unit 12 to manipulate the camera unit 3 and/or images being displayed on the extending portion 25. This is applied to all embodiments described below. In embodiments, the second display unit 12 may display various manipulation buttons or icons for manipulating the camera unit 3 and/or images being displayed on the extending portion 25, while the first display 2 displays an image captured by the camera.

In embodiments, the camera can capture an image of an object through the extension 25. The captured image passing through the extension 25 is substantially different from an image of the object that would have been captured by the camera when the extension 25 is not placed between the camera and the object.

In embodiments, the captured image passing through the extension 25 may be magnified or filtered.

In some embodiments, the extension 25 may include an optical image modifier which functions as a magnifying lens configured to magnify an image of an object passing therethrough. In other embodiments, the extension 25 may function as a filter configured to change color of the image by, for example, displaying a colored image on the extension 25 of the display 2. In embodiments, the extension may include an optical image modifier configured to modify an image passing therethrough by functioning as like long focus lenses, wide angle lenses, telephoto lenses, macro lenses, fisheye lenses, or zooming lenses.

In embodiments, the mobile device can include one or more controllers or processors to control or adjust the operation of the optical image modifier to change a magnifying ratio. Further, such processors can control or adjust the operation of the extension 25 of the display 2 to change the colors of the extension which functions as a filter.

Figure 8:
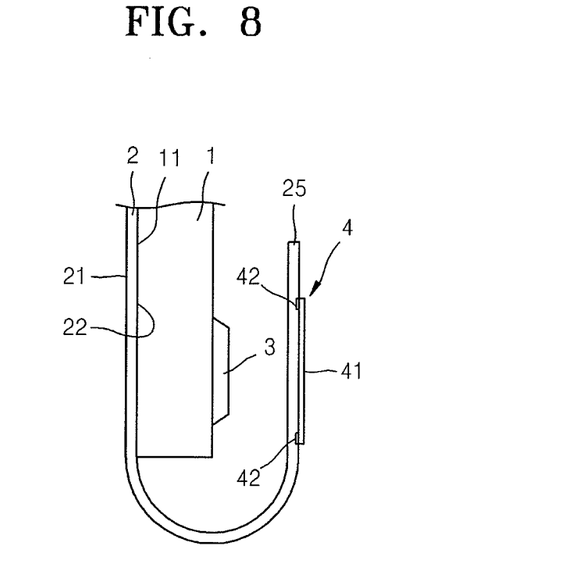
FIGS. 8 and 9 are side cross-sectional views schematically illustrating a display device according to other embodiments of the present invention.
Figure 9:
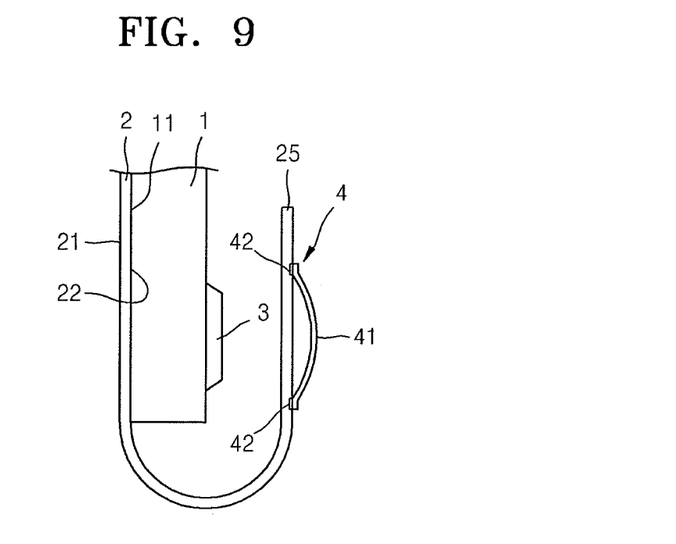

FIGS. 8 and 9 are side cross-sectional views schematically illustrating a display device according to other embodiments of the present invention. Here, the extending portion 25 may further include an optical adjusting unit or optical image modifier 4 for adding an optical function to the mobile device with the camera unit 3.

According to an embodiment of the present invention, the optical adjusting unit or optical image modifier 4 may be a lens unit 41. The lens unit 41 may include a transparent electroactive polymer layer, and at least an edge of the lens unit 41 is electrically connected to an electrode 42. The electrode 42 may be embedded in the extending portion 25 of the first display unit 2, but alternatively, the electrode 42 may be formed on a surface of the extending portion 25 of the first display unit 2. Although not shown in FIGS. 8 and 9, the electrode 42 may be electrically connected to a control unit mounted in the body 1 along a wire formed inside the first display unit 2, and may be manipulated as the user touches an image of the manipulation button displayed on the first surface 21 of the first display unit 2 as described above.

When electric power is applied to the electrode 42, the lens unit 41 may be deformed to have a certain shape, for example, a convex lens shown in FIG. 9. In embodiments, electric voltage may be applied to the electrode 42.

An optical magnifying lens effect may be generated in the camera unit 3 as the user drives the lens unit 41 while the extending portion 25 overlaps the camera unit 3. Accordingly, an image having a high quality desired by the user may be obtained even when the camera unit 3 has low specifications.

Figure 10:
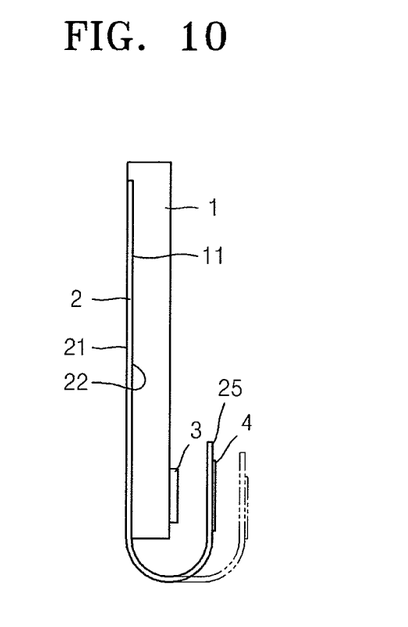
FIG. 10 is a side cross-sectional view schematically illustrating a display device according to another embodiment of the present invention.

FIG. 10 is a side cross-sectional view schematically illustrating a mobile or portable device having a display and a camera according to another embodiment of the present invention, wherein the extending portion 25 further includes the optical adjusting unit 4.

The optical adjusting unit 4 may be the lens unit 41 shown in FIG. 8 or 9, but alternatively, may be a color changing unit changing a color of light passing therethrough. For example, the display device may include an electrochromic unit for changing a color of light to a certain color when electric power is applied, or a color filter unit for further emphasizing light having a certain color regardless of application of electric power.

The user may move the extending portion 25 including the optical adjusting unit 4 back and forth in front of the camera unit 3 to obtain an optical effect of zoom-in and zoom-out.

Figure 11:
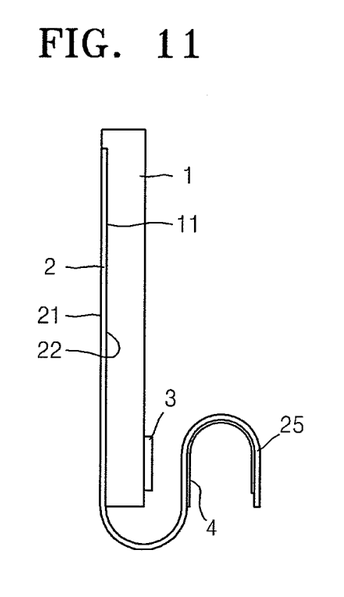
FIG. 11 is a side cross-sectional view schematically illustrating a display device according to another embodiment of the present invention.

Also, as shown in FIG. 11, an effect as if a multi-lens is used may be obtained when the extending portion 25 is bent a plurality of times to overlap the camera unit 3.

According to one or more embodiments described above, the body 1 overlaps the first display unit 2 in size except for the extending portion 25, but alternatively, the body 1 may have a size that is only slightly larger than the camera unit 3.

The camera unit 3 is disposed at the bottom of the body 1, but alternatively, may be disposed at the top of the body 1. In this case, the extending portion 25 may be disposed on the first display unit 2 to bend and overlap the body 1 from the top.

According to one or more embodiments of the present invention, a camera unit may be able to achieve various optical effects without having to increase a thickness and volume of a display device.

Also, a display device capable of obtaining an optical effect having a high quality may be provided without having to increase specifications of a camera unit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
    a main body comprising a first major surface and a second major surface;
    a first display unit comprising a first surface and a second surface that face opposite directions, wherein the first display unit is configured to realize an image to be viewed through the first surface ; and
    a camera unit provided on the second major surface of the main body,
    wherein the first display unit is configured such that an external light penetrates through the first and second surfaces,
    wherein the first display unit comprises a fixed segment integrated onto the first major surface of the main body,
    wherein the first display unit further comprises a bendable segment extending from the fixed segment and bendable relative to the main body such that the bendable segment is bent to have a portion thereof positioned in front of the camera, and
    wherein the first display unit further comprises an optical adjusting unit provided in the bendable segment.

2. The display device of claim 1, wherein the first display unit further comprises a touch sensing portion.

3. The display device of claim 2, wherein the touch sensing portion is disposed on the first surface.

4. The display device of claim 1, wherein the optical adjusting unit comprises a selective lens unit comprising an electrode and an electroactive polymer that is electrically connected to the electrode and is substantially transparent.

5. The display device of claim 1, wherein the optical adjusting unit comprises a color changing unit configured to change a color of the external light penetrating through the first and second surfaces.

6. The display device of claim 1, wherein the main body comprises a second display unit overlapping the first display unit and configured to display an image towards the first display unit,
    wherein the image of the second display unit penetrates through the first and second surfaces.

7. A display unit comprising:
    a main body comprising a first major surface and a second major surface
    a camera unit on the second major surface of the main body; and
    a first display unit comprising first and second surfaces facing opposite directions, the first display unit configured such that an external light penetrates through the first and second surfaces,
    wherein the first display unit is configured to realize an image through the first surface ,
    wherein the first display unit comprises a fixed segment integrated onto the first major surface of the main body,
    wherein the first display unit further comprises a bendable segment extending from the fixed segment and configured to bend such that a portion of the bendable segment is positioned over the camera unit, in which the portion overlaps the camera unit when viewed in a direction perpendicular to the second major surface.

8. The display device of claim 7, wherein the first display unit is flexible.

9. The display device of claim 7, wherein the first display unit further comprises a lens unit in the bendable segment,
    wherein the lens unit comprises an electrode and an electroactive polymer that is electrically connected to the electrode and is substantially transparent.

10. The display device of claim 7, wherein the first display unit further comprises a color changing unit configured to change a color of the external light penetrating through the bendable segment.

11. The display device of claim 7, wherein the main body further comprises a second display unit overlapping the first display unit and configured to display an image towards the first display unit.

12. A portable device comprising:
    a main body comprising a first surface and a second surface facing away from the first surface;
    a camera provided on the first surface; and
    a deformable film extending from second surface of the main body and configured to deform such that a portion of the deformable film is placed in front of the camera and overlaps the camera when viewed in a direction perpendicular to the first surface, wherein the portion placed in front of the camera is transparent such that the camera is to capture an image through the portion, wherein the at least part of the deformable film is deformed such that at least two folds of the deformable film is placed in front of the camera.

13. The device of claim 12, further comprising a magnifying lens placed on the portion such that the image through the portion is magnified before reaching the camera.

14. The device of claim 12, further comprising a display on the second surface of the body, wherein the deformable film is an extension of the display.

15. The device of claim 12, wherein once deformed, the deformable film is further configured to substantially maintain its structural configuration for image capturing through the portion.

16. A portable device comprising:
a main body comprising a first surface and a second surface facing away from the first surface;
a camera provided on the first surface;
a deformable film extending from second surface of the main body and configured to deform such that a portion of the deformable film is placed in front of the camera and overlaps the camera when viewed in a direction perpendicular to the first surface, wherein the portion placed in front of the camera is transparent such that the camera is to capture an image through the portion; and
a magnifying lens placed on the portion such that the image through the portion is magnified before reaching the camera,
wherein the magnifying lens comprises a deformable sheet placed over the portion of the flexible film, wherein the deformable sheet is configured to deform for changing a magnifying ratio of the lens such that the image is magnified with a varying magnifying ratio before reaching the camera.

17. The device of claim 16, wherein the deformable sheet comprises an electroactive polymer layer and an electrode configured to apply electricity to the electroactive polymer layer.

18. A portable device comprising:
a main body comprising a first surface and a second surface facing away from the first surface;
a camera provided on the first surface; and
a deformable film extending from second surface of the main body and configured to deform such that a portion of the deformable film is placed in front of the camera and overlaps the camera when viewed in a direction perpendicular to the first surface, wherein the portion placed in front of the camera is transparent such that the camera is to capture an image through the portion,
wherein the portion comprises a light emitting matrix therein capable of generating colored light such that the image through the portion is colored before reaching the camera.

19. A method of operating a portable device, comprising:
providing the portable device of claim 12;
deforming at least part of the deformable film to have the portion placed in front of the camera; and
capturing, by the camera, an image through the portion.

20. The method of claim 19, wherein deforming comprises adjusting a distance between the camera and the portion of the deformable film.

* * * * *